US012706884B2

(12) United States Patent
Kozlovski et al.

(10) Patent No.: US 12,706,884 B2
(45) Date of Patent: Aug. 11, 2026

(54) CLIENT-SPECIFIC PROXY POOL MANAGEMENT, AND APPLICATIONS THEREOF

(71) Applicant: Oxylabs, UAB, Vilnius (LT)

(72) Inventors: Miroslav Kozlovski, Vilnius (LT); Rytis Kaplunas, Vilnius (LT); Lukas Taskunas, Vilnius (LT)

(73) Assignee: Oxylabs, UAB, Vilnius (LT)

( * ) Notice: Subject to any disclaimer, the term of this patent is extended or adjusted under 35 U.S.C. 154(b) by 70 days.

(21) Appl. No.: 18/970,667

(22) Filed: Dec. 5, 2024

(65) Prior Publication Data

US 2026/0163865 A1 Jun. 11, 2026

(51) Int. Cl.
*H04L 29/06* (2006.01)
*H04L 9/40* (2022.01)

(52) U.S. Cl.
CPC ........ *H04L 63/0281* (2013.01); *H04L 63/029* (2013.01)

(58) Field of Classification Search
CPC ............... H04L 63/0281; H04L 63/029; H04L 67/1004; H04L 67/1017; H04L 67/1021; G06F 16/951
See application file for complete search history.

(56) References Cited

U.S. PATENT DOCUMENTS 6,633,914 B1 10/2003 Bayeh et al.
7,937,477 B1 5/2011 Day et al.
8,024,476 B2 9/2011 Eydelman et al.
8,090,818 B2 * 1/2012 Sindambiwe ......... G06F 16/957 709/224
10,637,956 B1 * 4/2020 Juravicius ............. H04L 67/141
10,880,231 B2 12/2020 Murashko et al.
11,190,374 B2 11/2021 Shribman et al.
11,463,536 B2 10/2022 Vasiliauskas et al.
11,902,253 B2 2/2024 Shribman et al.
2010/0017500 A1 1/2010 Lee
2015/0073875 A1 * 3/2015 Rahman ........... G06Q 10/06393 705/7.39
2022/0086248 A1 * 3/2022 Vilcinskas ............ H04L 67/563
2022/0100808 A1 * 3/2022 Juravicius ............. G06F 16/951
2024/0070218 A1 * 2/2024 Gazit .................. G06F 16/9577

FOREIGN PATENT DOCUMENTS

WO WO-2023280593 A1 * 1/2023 ........... G06F 16/972

* cited by examiner

*Primary Examiner* — Yogesh Paliwal
(74) *Attorney, Agent, or Firm* — Sterne, Kessler, Goldstein & Fox P.L.L.C.

(57) ABSTRACT

Provided herein are system, apparatus, device, method and/or computer program product embodiments, and/or combinations and sub-combinations thereof, for proxy pool management on a client-specific basis. Each client has his own configuration for a proxy pool. While multiple clients may share a proxy pool and pool indexes, each client has his own cursor designating its own position within the pool index. When a request is made by a client, the proxy is selected at the position of the client's cursor. By having client-specific cursors, each client can take advantage of a greater level of unique IP addresses as offered by the pool.

25 Claims, 7 Drawing Sheets

CLIENT-SPECIFIC PROXY POOL MANAGEMENT, AND APPLICATIONS THEREOF

BACKGROUND

Field

This field is generally related to using machine learning to web scraping.

Related Art

Proxy servers generally act as intermediaries for requests from clients seeking content, services, and/or resources from target servers (e.g., web servers) on the internet. For example, a client may connect to a proxy server to request data from another server. The proxy server evaluates the request and forwards the request to the other server containing the requested data. In the forwarded message, the source address may appear to the target to be not the client, but the proxy server. After obtaining the data, the proxy server forwards the data to the client. Depending on the type of request, the proxy server may have full visibility into the actual content fetched by the client, as is the case with an unencrypted Hypertext Transfer Protocol (HTTP) session. In other instances, the proxy server may blindly forward the data without being aware of what is being forwarded, as is the case with an encrypted Hypertext Transfer Protocol Secure (HTTPS) session.

To interact with a proxy server, the client may transmit data to the proxy server formatted according to a proxy protocol. The HTTP proxy protocol is one example of how the proxy protocol may operate. HTTP operates at the application layer of the network stack (layer 7). In another example, HTTP tunneling may be used, using, for example, the HTTP CONNECT command. In still another example, the proxy may use a SOCKS Internet protocol. While the HTTP proxy protocol operates at the application layer of the OSI (Open Systems Interconnection) model protocol stack, SOCKS may operate at the session layer (layer 6 of the OSI model protocol stack). Other protocols may be available forwarding data at different layers of the network protocol stack.

Proxy servers, however, do more than simply forward web requests. In some instances, proxy servers can act as a firewall, act as a web filter, provide shared network connections, and cache data to speed up common requests. Proxy servers can also provide privacy and can control internet usage of employees and children. Proxies can also be used to bypass certain internet restrictions (e.g., firewalls) and to circumvent geo-based content restrictions. For example, if a client requests content from a webpage located on a webserver in one country, but the client's home country does not allow access to that content, the client can make the request through a proxy server that contacts and retrieves the content, thereby concealing the location of the target server. Proxy servers can also be used for web scraping, data mining, and other similar tasks. A proxy server changes the request's source IP address, so the web server is not provided with the geographical location of the scraper. Using the proxy server makes a request appear more organic and thus ensures that the results from web scraping represents what would actually be presented were a human to make the request from that geographical location.

Proxy servers fall into various types depending on the IP (Internet Protocol) address used to address a web server. A residential IP address is an address from the range specifically designated by the owning party, usually Internet service providers (ISPs), as assigned to private customers. Usually a residential proxy is an IP address linked to a physical device, for example, a mobile phone or desktop computer. Blocks of residential IP addresses may be bought from the owning proxy service provider by another company directly in bulk. Mobile IP proxies are a subset of the residential proxy category. A mobile IP proxy is one with an IP address that is obtained from mobile operators. A datacenter IP proxy is the proxy server assigned with a datacenter IP. Datacenter IPs are IPs owned by companies, not by individuals.

Many service providers across the Internet provide services to consumers, and hence are configured to block, or require additional verification (such as CAPTCHAS), when they receive requests originated from data centers. Residential and mobile IP proxies may be advantageous over data center proxies because, to the target website, requests from these proxies appear to originate from consumers.

Exit node proxies, or simply exit proxy, are gateways where the traffic hits the Internet. There can be several proxies used to perform a user's request, but the exit proxy is the final proxy that contacts the target and forwards the information from the target to a user device, perhaps via a previous proxy. There can be several proxies serving the user's request, forming a proxy chain, passing the request through each proxy, with the exit proxy being the last link in the chain that ultimately passes the request to the target.

Proxies with similar characteristics tend to be incorporated into pools, which may limit the number of IP addresses that each client can use. Methods and systems are needed to increase the number of unique IP address each client can use within the pool.

BRIEF SUMMARY

In an embodiment, a method for managing proxy pools is provided. The method includes various steps that occur in response to a first request from a first client to scrape data from a first target server. In particular, a proxy pool index associated with the first client is identified. The proxy pool index includes an ordered plurality of proxy servers satisfying criteria of the first client. A first cursor of the first client is retrieved. The first cursor defines a first position of the first client within the ordered plurality of proxy servers. From the ordered plurality of proxy servers, a first proxy server at the first position is selected according to the first cursor. The first request is transmitted to the first target server via the selected first proxy server. Finally, the first cursor is advanced to a first next position in the ordered plurality of proxy servers. The method also includes various steps that occur in response to a second request to scrape data from a second target server. The second request is from a second client associated with the proxy pool index. In particular, a second cursor of the second client is retrieved. The second cursor defines a second position of the second client within the ordered plurality of proxy servers. The second cursor is different than the first cursor. From the ordered plurality of proxy servers, a second proxy server at the second position is selected according to the second cursor. The second request to the second target server is transmitted via the selected second proxy server. The second cursor is advanced to a second next position in the ordered plurality of proxy servers.

System, device, and computer program product aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for proxy pool management on a client-specific basis. Each client has his own configuration for a proxy pool. While multiple clients may share a proxy pool and proxy pool indexes, each client has his own cursor designating its own position within the pool index. When a request is made by a client, the cursor is advanced, and the proxy is selected at the position of the client's cursor. By having client-specific cursors, each client can take advantage of a greater level of unique IP addresses as offered by the pool.

Figure 1A:
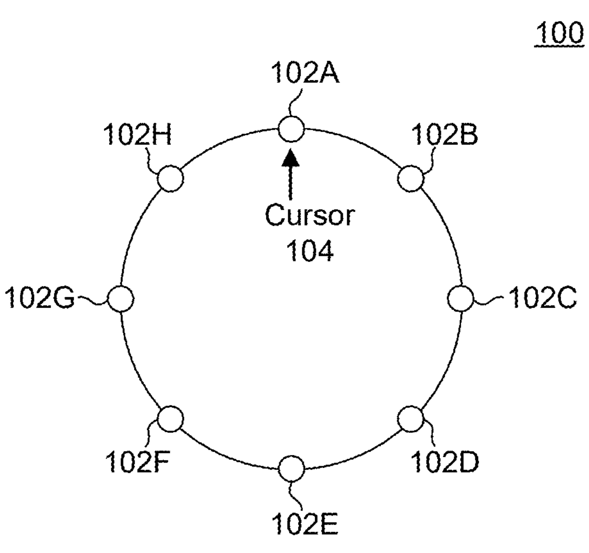
FIGS. 1A-C illustrate a technique for proxy pool management where clients share a cursor to select a proxy from a pool.
Figure 1B:
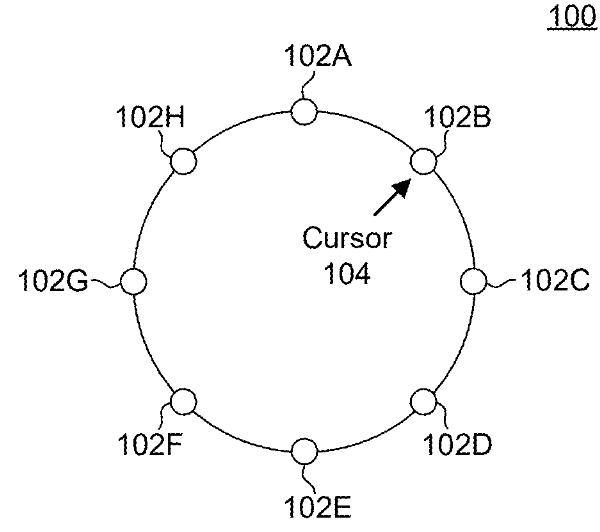
Figure 1C:
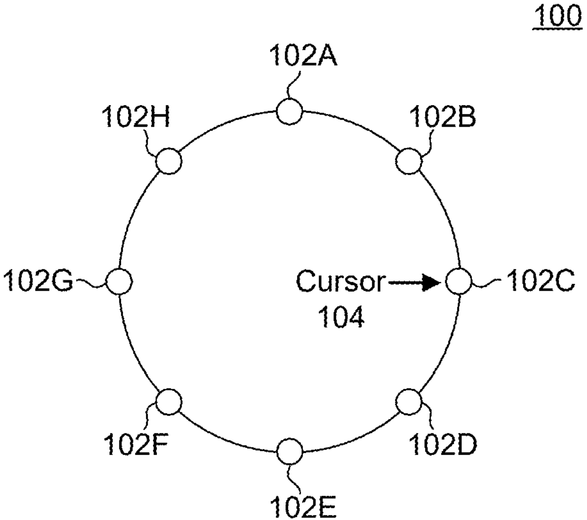

FIGS. 1A-C illustrate a technique for proxy pool management where clients share a cursor to select a proxy from a pool.

FIGS. 1A-C each illustrate a block diagram illustrating a proxy pool index 100 specifying an ordered plurality of exit proxies 102A-H for providing multiple exit proxies within a proxy pool architecture, according to some embodiments. The proxy pool index 100 may be configured to manage and provide access to a group of exit proxies that can be used for various network operations, such as web scraping or accessing content from different geographic locations. Each of exit proxy 102A-H may be configured to receive requests from clients and forward those requests to target servers on behalf of the clients, potentially acting as an intermediary. This could allow the client's requests to appear to come from the IP address of the exit proxy rather than directly from the client, which may provide a layer of anonymity and potential access to geo-restricted content.

In some embodiments, the proxy pool index 100 may include exit proxies 102A-102H arranged in a circular structure, which may allow for continuous cycling through the available exit proxies. This circular arrangement may enable efficient use of the exit proxies and could help distribute network traffic across multiple servers. The number of exit proxies in the pool may vary based on the specific requirements of the system or client needs. For example, the pool could contain as few as two exit proxies or may scale up to hundreds or thousands of servers depending on the scale of operations and diversity of IP addresses required.

A cursor 104 may be included in proxy pool index 100 and may indicate the current position within the circular list of exit proxies. The cursor 104 may be used to select the next exit proxy for use when a request is made to the proxy pool. As requests are processed, the cursor 104 may advance to the next position in the circular list, which could ensure that subsequent requests are directed to different exit proxies in a round-robin fashion. This mechanism may help to distribute load evenly across the exit proxies and could reduce the likelihood of any single server being overused or blocked by target websites.

The proxy pool index 100 may be configured according to specific criteria or options set by clients. At least some of the specific criteria or options set may be defined by the client in a request for an exit proxy. As mentioned above, the proxy pool index 100 is associated with a proxy pool. The exit proxies to include in the proxy pool may be specified by a system administrator. These options could include geographic locations, performance metrics, or other attributes of the exit proxies. For instance, as will be described in greater detail below, a client might require a pool of exit proxies all located within a specific country or region, or with IP addresses from a particular range or autonomous system number (ASN).

In operation, when a client makes a request that requires an exit proxy, the system may determine whether proxy pool index 100 exists and meets requirements of the request. If proxy pool index 100 has yet to have been created, it is created to include the exit proxies in the proxy pool that meet the requirements in the request. Also, cursor 104 is set to a random exit proxy within the index. If proxy pool index 100 already exists and meets requirements of the request, the cursor 104 is advanced to the next position then select the exit proxy at the advanced cursor position from the proxy pool index 100. Alternatively, the exit proxy may be selected at cursor 104's current position and, after the selection, the cursor 104 may be advanced to the next position, preparing for the next request. This is illustrated in FIG. 1B and FIG. 1C.

As shown in FIG. 1B, after a client has requested use of proxy 102A, when another client assigned to the same proxy pool requests use of a proxy with the same requirements of proxy pool index 100, cursor 104 advances to proxy 102B and the client would be assigned proxy 102B. When yet another client assigned to the same proxy pool requests use of a proxy with the same requirements of proxy pool index 100, cursor 104 would advance again to proxy 102C as illustrated in FIG. 1C and the new client would be assigned proxy 102C. By using the same cursor for multiple clients, each client may not be able to take advantage of the full diversity of IP addresses specified in proxy pool index 100. According to an embodiment, different clients utilizing a proxy pool each have their own cursor so that each may have access to the diversity of IP addresses in the pool. This is illustrated in FIGS. 2A and 2B.

Figure 2A:
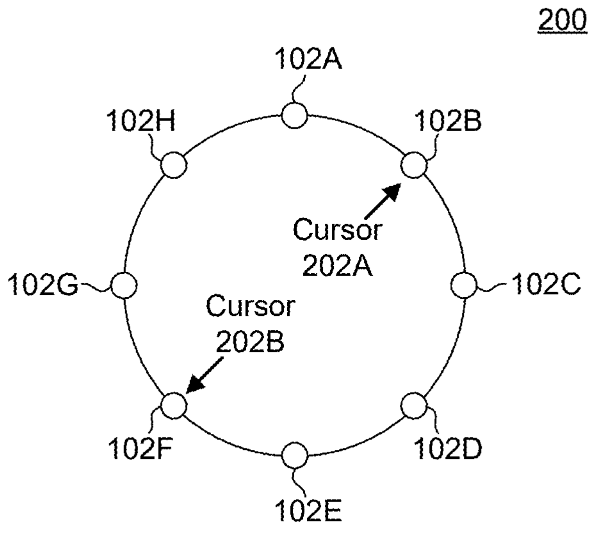
FIGS. 2A-B illustrate a technique for proxy pool management where each client has an independent cursor to select a proxy from a pool, according to an embodiment.
Figure 2B:
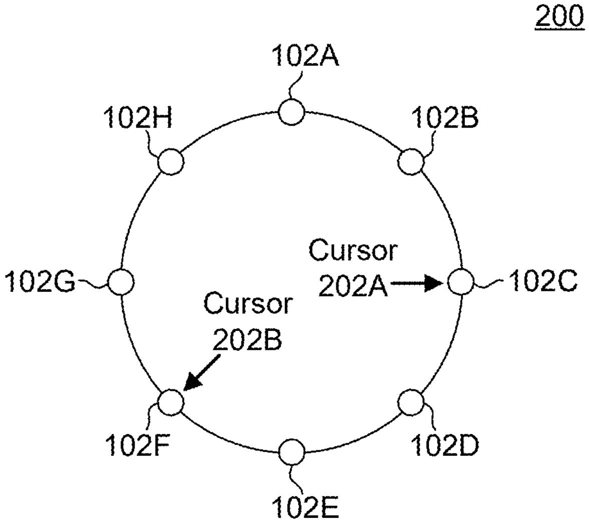

FIGS. 2A-B may illustrate a proxy pool index 200 including the ordered plurality of exit proxies 102A-102H for providing multiple exit proxies within a proxy pool architecture, according to some embodiments. The proxy pool index 200 may enable dynamic allocation and management of exit proxies for multiple clients accessing network resources. In some embodiments, proxy pool index 200 may include exit proxies 102A-102H arranged in a circular structure, potentially allowing for continuous cycling through the available exit proxies.

As described above, when a client sends a proxy request, options are included in the proxy request. A determination is made as to whether proxy pool index 200 exists and satisfies the request. However, here, each client associated with proxy pool index 200 may have its own cursor (e.g., cursors 202A, 202B) indicating its current position within the ordered plurality of exit proxies. When a client makes a request, if a cursor is pointing to exit proxy 102B (as illustrated in FIG. 2A), it may be selected to handle that client's request. After being used, the relevant cursor may then advance to the next exit proxy in the circular list, such as exit proxy 102C (as illustrated in FIG. 2B). As shown in FIG. 2B, advancing cursor 202A does not affect cursor 202B, which remained on proxy 102F.

The cursors may enable independent traversal of the proxy pool index by different clients, allowing each client to maintain its own state and progression through the available exit proxies. This independent cursor approach may expose more diversity of IP addresses within proxy pool 200 to each client. The use of individual cursors per client may allow the same individual exit proxy to be accessed by different clients at similar times when the respective client's respective cursor positions are positioned on the same exit proxy.

The circular structure of proxy pool index 200 may ensure that once a cursor reaches the end of the list (e.g., exit proxy 102H), it wraps around to the beginning (e.g., exit proxy 102A), potentially providing a continuous and efficient utilization of all available exit proxies within the pool.

When a new client joins the system, its cursor (e.g., 202A or 202B) may be intelligently initialized to a position in the pool index that optimizes overall system performance. This could involve considering factors such as current load distribution, client location, or specific client requirements.

The system may implement adaptive cursor advancement strategies. For example, if a selected exit proxy fails to satisfy conditions of the request or fails to respond or performs poorly, the cursor could advance multiple positions to potentially skip over noncompliant or problematic proxies.

In some embodiments, certain exit proxies within the pool may be specialized for particular types of requests or operations. The cursor advancement and selection process could be modified to take these specializations into account, potentially directing specific types of client requests to the most suitable exit proxies. This will be described in greater detail below with respect to FIG. 3.

Figure 3:
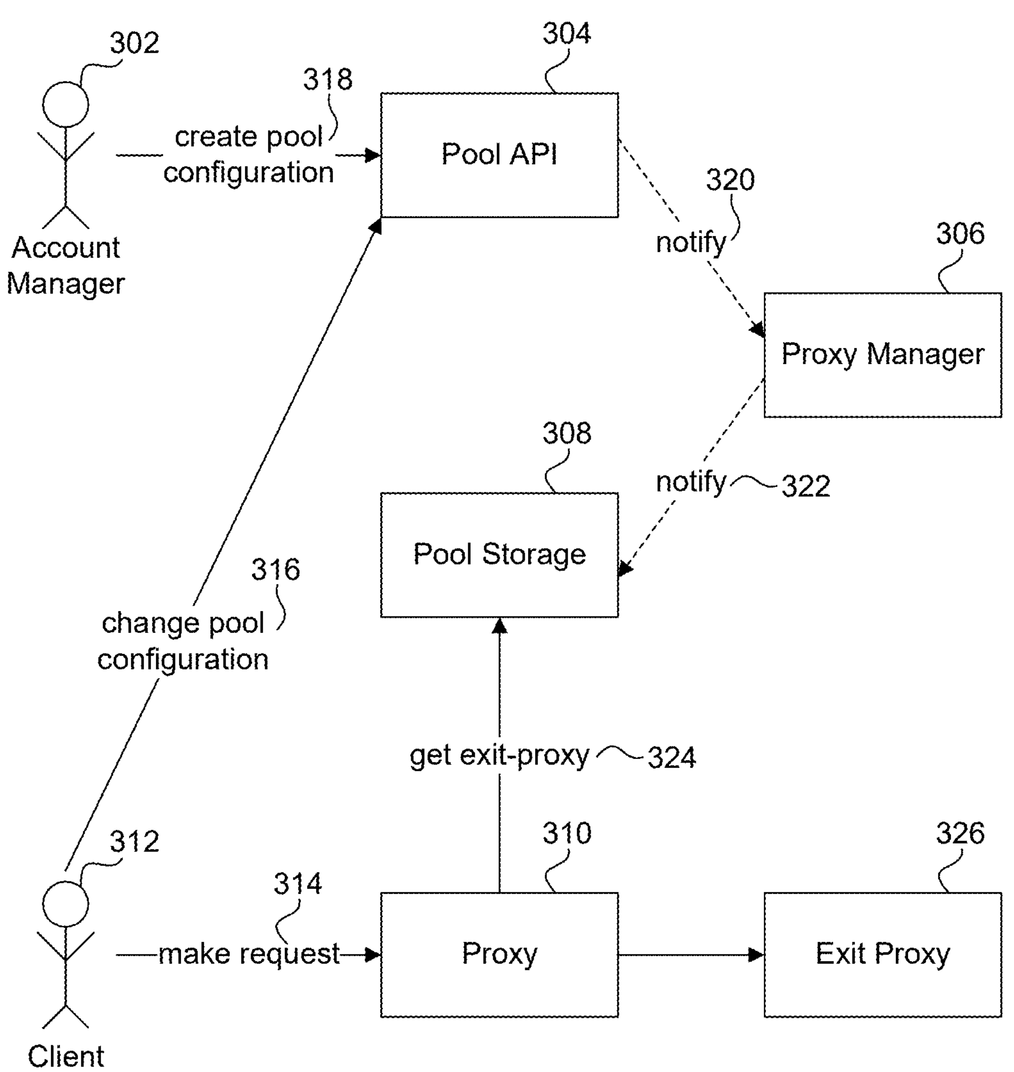
FIG. 3 illustrates a system for proxy pool management, according to an embodiment.

FIG. 3 is a block diagram illustrating a system 300 for dynamically managing proxy pools and handling client requests. System 300 may include an account manager 302, a pool API 304, a proxy manager 306, a pool storage 308, an intermediate proxy server 310, a client 312, and an exit proxy 326.

In some embodiments, account manager 302 may be responsible for managing client accounts and configurations. It may create pool configurations (318) and send them to pool API 304. Account manager 302 may allow for customization of proxy pools based on specific client needs, enabling the dynamic creation and modification of proxy pools. It may provide an interface, such as a web portal or API, that could allow account administrators to specify pool configuration parameters like:

- geographic restrictions (e.g., included/excluded country codes, states and cities),
- IP address characteristics (e.g., included/excluded IP addresses, included/Excluded Subnets, IP address types (data center/Internet Service Provider/mobile/etc),
- traffic priority levels (choose proxies that can transfer data faster or choose proxies that may be slower (this means we increase the size of the pool)),
- a desired latency requirement for the exit proxy,
- IP version (IPv4/IPv6), and
- database to use in determining an IP address's geography and characteristics.

Change pool configuration command 316 may allow a client to dynamically adjust the settings of their associated proxy pool. This command may include parameters specifying desired changes, such as modifying the geographical location of exit proxies, adjusting performance criteria, or updating IP version requirements.

Client 312 may represent the end-user or application making requests through the proxy system. It can also issue commands to change pool configurations (316) through Pool API 304.

Pool API 304 may serve as an interface for managing proxy pool configurations. It may receive commands to create (318) or change (316) pool configurations from the account manager 302 or clients. Upon receiving these commands, pool API 304 may send notifications (320) to proxy manager 306 to update or create new proxy pools. Pool API 304 may act as a central point of control for pool-related operations, potentially abstracting the complexity of pool management from other system components. It may provide a standardized interface for creating, modifying, and querying pool configurations, which could ensure that all pool-related actions are handled consistently across the system.

Proxy manager 306 may oversee the management of exit proxies and their allocation to pools. It may receive notifications (320) from pool API 304 and use this information to organize and maintain the exit proxies in appropriate pools based on client configurations. Proxy manager 306 may evaluate available exit proxies to determine which ones match the criteria specified in the pool configurations. It may then send notifications (322) to pool storage 308 with information about exit proxies that meet the criteria for different pool configurations. Additionally, the proxy manager 306 may be responsible for monitoring the health and status of exit proxies in the system, potentially handling tasks like load balancing across exit proxies and optimizing exit proxy allocation based on usage patterns and client needs.

Pool storage 308 may store and manage the proxy pools and their associated data. It may receive notifications (322) from proxy manager 306 to update its stored proxy pools. Pool storage 308 may be queried by intermediate proxy server 310 to retrieve exit proxies (324) for client requests.

Client 312 makes a request 314 to make a proxy request. As described above, request 314 may, for example, be an HTTP proxy protocol request or a SOCKS request. Proxy request 314 may represent a communication sent from client 312 to the intermediate proxy server 310 to initiate a web scraping operation. It may typically contain information such as the URL of the target server, any necessary authentication credentials, and potentially additional options specifying how the exit proxy should handle the request. In addition, request 314 may include client 312's username, and possible additional request options that may further specify attributes of a desired IP address from the pool. The additional request options include a selection of all exit nodes that belong to the specified pool and are:

- connected to the same infrastructure location where the client's request is processed;
- located on the specified continent;
- located on the specified continent and belongs to the specified platform;
- located in the specified state;
- located in the specified state and belongs to the specified platform;
- located in the specified state and city;
- located in the specified state and city and belongs to the specified platform;
- located in the specified country;
- located in the specified country and belongs to the specified platform;
- located in the specified country and city;
- located in the specified country and city and belongs to the specified platform;
- located in the specified country and belongs to the specified ASN;
- located in the specified country and belongs to the specified ASN and platform; and
- located in the specified country and belongs to the specified postal code;
- belongs to the specified ASN.

Intermediate proxy server 310 may act as a gateway between client 312 and the exit proxies 326. It may receive client requests (314) and query the pool storage 308. In request to the query, pool storage 308 determines whether a pool index for the client's pool and meeting the criteria of the requests exists. If it does not exist, a new pool index is instantiated and a cursor for the client is placed at a random position. If it does exist, the pool index is retrieved and a cursor specified to the client is advanced to a next position. Pool storage 308 gets an appropriate exit proxy (324) based on the cursor of the pool index.

Upon receiving the exit proxy information from pool storage 308, the intermediate proxy server 310 may then forward the client's original request to selected exit proxy 326.

Exit proxy 326 may be the final proxy in the chain that connects to the target server on behalf of the client. It may receive forwarded requests from the intermediate proxy server 310 and communicate with the target server. By serving as this final hop, the exit proxy 326 may mask the original IP address and identity of the client, providing anonymity and privacy for the client's web activities.

Figure 4:
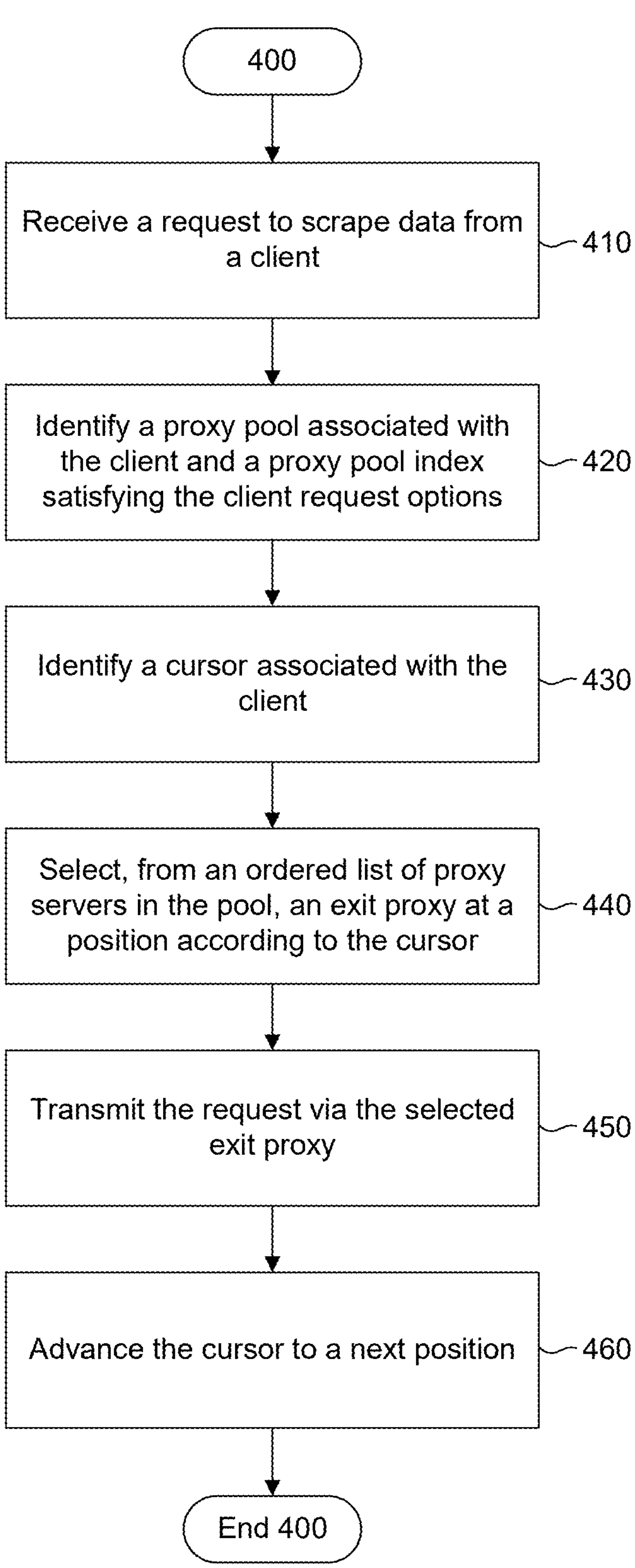
FIG. 4 illustrates a method for proxy pool management, according to an embodiment.

FIG. 4 is a flowchart illustrating a method 400 for selecting and using exit proxies from a proxy pool to fulfill client requests for scraping data, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 3. However, method 400 is not limited to that example embodiment.

The method may begin at step 410 by receiving a request to scrape data from a client. This request may come from a client device or application seeking to retrieve information from a target server.

At step 420, the method may identify a proxy pool index in a proxy pool associated with the requesting client. In particular, at step 420, a pool associated with the client is identified, and a proxy pool index associated with the pool and satisfying options in the request is identified. The proxy pool index may comprise an ordered plurality of exit proxies that satisfy certain criteria specified by that client. For example, the proxy pool index may contain only exit proxies from particular geographic regions or with certain performance characteristics. The proxy pool identification may involve looking up the client's information in a database or configuration file to determine which proxy pool has been assigned to them. The proxy pool could be customized based on the client's specific needs or requirements, such as geographic location preferences, performance characteristics, or other attributes of the exit proxies.

The proxy pool associated with the client may have been previously created and configured, for example through the pool configuration process described in relation to FIG. 3, where an account manager or the client itself can create or modify pool configurations. This may allow for dynamic and flexible proxy pool management tailored to each client's needs.

Step 430 may involve identifying a cursor associated with the client within the identified proxy pool index. This cursor may define the client's current position within the ordered plurality of exit proxies in the pool. Each client may have its own independent cursor for a given proxy pool index. In some embodiments, if no cursor exists for the client (e.g., for a new client's first request for the proxy pool index), the pool storage may initialize a new cursor. This could involve randomly selecting a starting position within the proxy pool index or using a predefined initialization strategy.

The cursor may serve as a pointer or marker indicating which exit proxy in the pool should be selected next for that particular client. By maintaining separate cursors for each client, the pool storage may allow multiple clients to independently traverse the proxy pool index without interfering with each other's exit proxy selections. The cursor may be stored and retrieved from a database or other data structure within pool storage 308 that maintains the association between clients and their respective cursor positions within each proxy pool index.

At step 440, the method may select an exit proxy from the ordered plurality at the position indicated by the client's cursor. Specifically, the cursor may define a current position within the ordered plurality of exit proxies in the pool. In step 440, the pool storage may then select the exit proxy that is at the position in the ordered plurality indicated by the client's cursor.

The ordered plurality of exit proxies may be implemented as a circular doubly linked list, as shown in the FIGS. 2A-B, to allow continuous cycling through the proxies. The exit proxies in the pool index may be selected to satisfy configuration parameters specified for that client or group of clients, such as geographic location, autonomous system number, IP version, or other characteristics.

In some embodiments, the selection process may incorporate additional factors beyond the cursor position. For instance, the pool storage might check the current status of the exit proxy at the cursor position (e.g., its current load or recent performance metrics) and potentially skip to the next proxy if the current one is overloaded or underperforming.

Additionally or alternatively, the client may have a list of blocked IP addresses. The next exit proxy may be selected such that it is not in the list of blocked IP addresses. Additionally or alternatively, as described above, the request may impose additional filtering criteria on the proxy selection. In that case, the next exit proxy satisfying the additional criteria may be selected.

Figure 5A:
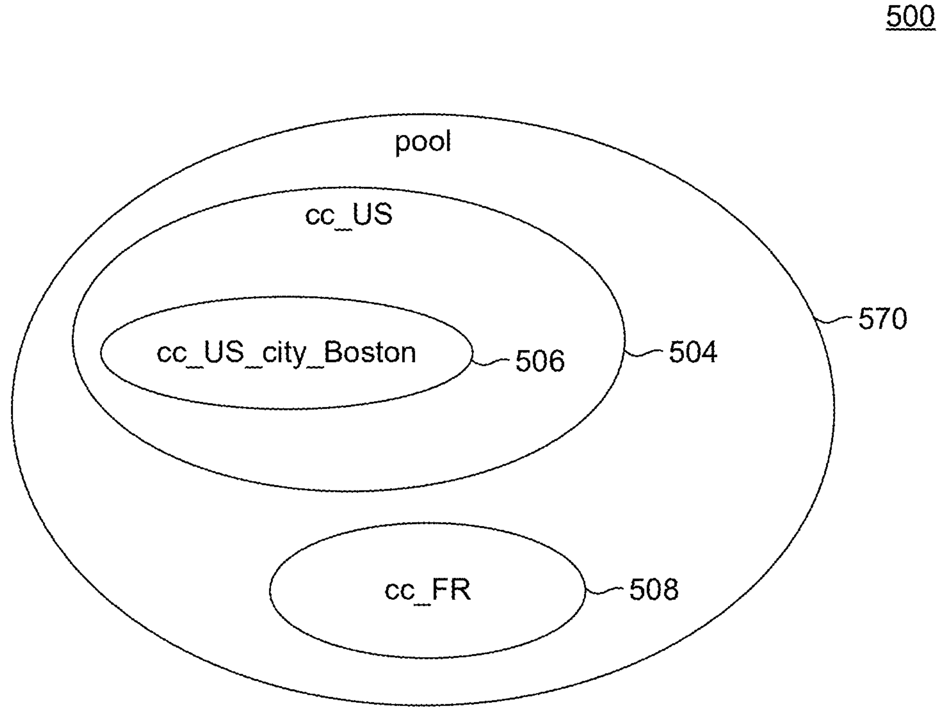
FIG. 5A illustrates a Venn diagram illustrating how proxies within pools can have sub-set, according to an embodiment.

FIG. 5A may be a Venn diagram 500 illustrating how a client's exit proxy pool can be organized and indexed based on different criteria. The diagram may show the relationships between different subsets of exit proxies within a pool 570 identified by unique ID. In some embodiments, the outermost circle may represent the entire pool 570 of exit proxies associated with a particular unique ID. This pool 570 ID could uniquely identify the overall configuration and set of exit proxies available to a client. The ID may serve as the top-level identifier that associates a client with their customized proxy pool 570. When a client makes a request to scrape data, as described in the method of FIG. 4, the system may use this ID to identify the appropriate proxy pool 570 associated with the client (step 420). If no further options are specified in the request, the default index 502 may serve as the pool index for that request.

Within the main pool, there may be three nested subsets or "pool indexes" that group exit proxies based on specific attributes specified in the request:

- The cc_US pool index 504 subset may represent all exit proxies located in the United States. The cc_US pool index 504 could contain exit proxies that satisfy the criteria of being located in the United States. This may allow clients to specifically request exit proxies from the US when needed for their scraping or other proxy-based operations.
- The cc_US_city_Boston pool index 506 subset may be a more specific subset nested within cc_US, potentially containing only exit proxies located in Boston, Massachusetts, USA. The cc_US_city_Boston pool index 506 could allow for more granular geographic targeting of exit proxies compared to the parent cc_US pool index 504.
- The cc_FR pool index 508 subset may represent all exit proxies located in France. It could be separate from the US-based subsets.

Figure 5B:
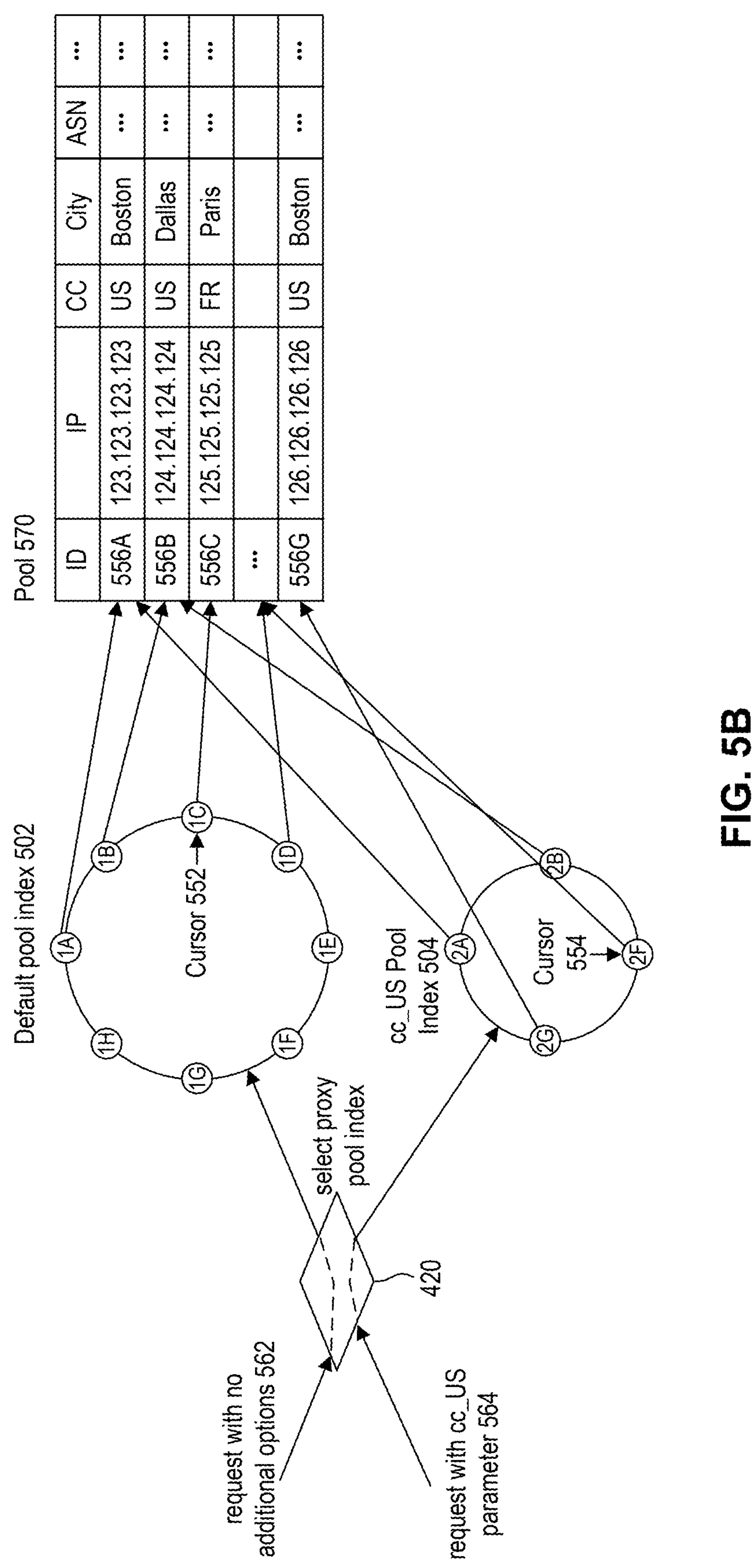
FIG. 5B is a diagram illustrating the relationship between pools and pool indices.

FIG. 5B shows a diagram 550 illustrating an example of how different requests from the same client may result in selection of different pool indexes. Diagram 550 shows a pool 570, default pool index 502 and cc_US pool index 504. The default pool index 502 has a cursor 552 and the cc_US pool index 504 has a cursor 554. Cursors 552 and 554 are different cursors for the same client. As described elsewhere, default pool index 502 and cc_US pool index 504 may each have other cursors for other clients as well (not shown).

As illustrated in diagram 550, both default pool index 502 and cc_US pool index 504 are linked to various proxies 556A-G in proxy pool 570. The default pool index 502 maps to all of the different proxies in pool 570. The cc_US pool index 504, on the other hand, maps only to the subset that are located in the US. For example, proxy 556C is included in the default pool index 502 but not included in cc_US pool index 504, as its IP address is located in France, outside of the United States.

Diagram 550 illustrates two example requests: a request with no additional options 562 and a request with a cc_US parameter 564. When the request with no additional options 562 is received, a default pool index 502 and its associated cursor 552 is selected at steps 420 and 430. When the request with additional cc_US option 564 is received, a pool index cc_US pool index 504 and its associated cursor 554 is selected at steps 420 and 430. The respective pool indexes and cursors are used to identify the proxy server as described above with respect to step 440.

Step 450 may entail transmitting the client's scraping request to the target server via the selected exit proxy. The exit proxy may act as an intermediary, forwarding the request and relaying the response back to the client. Specifically, after selecting an exit proxy from the ordered plurality of exit proxies in the proxy pool at step 440, the intermediate proxy server 310 may transmit the client's request to scrape data from a target server via the selected exit proxy. This may allow the client's request to be routed through the chosen proxy, potentially providing anonymity and avoiding IP-based restrictions at the target server. The transmission in step 450 may involve standard network protocols such as HTTP/HTTPS, depending on the nature of the scraping request.

Finally, in step 460, the cursor for the client may be advanced to the next position in the ordered plurality of exit proxies. This may prepare the pool storage to select a different proxy for the client's next request, promoting even usage across the pool. After selecting and using an exit proxy for the client's request in steps 440-450, the cursor associated with that client may be moved to point to the next exit proxy in the ordered plurality. This may advance the cursor so that a different exit proxy will likely be selected for the client's next request.

As mentioned above, additionally or alternatively, the cursor can be advanced on request. For example, instead of happening in preparation for the client's next request, it may occur when the next client request is received, but before the proxy server is selected from the server.

The advancing of the cursor may involve incrementing a pointer or index to the next position in the circular list of exit proxies. If the cursor was at the last position in the list, it may wrap around to the first position.

This step may help ensure that subsequent requests from the same client utilizes different exit proxies in the pool over time, potentially providing load balancing across the exit proxies and making it more difficult to track a client's activity.

Figure 6:
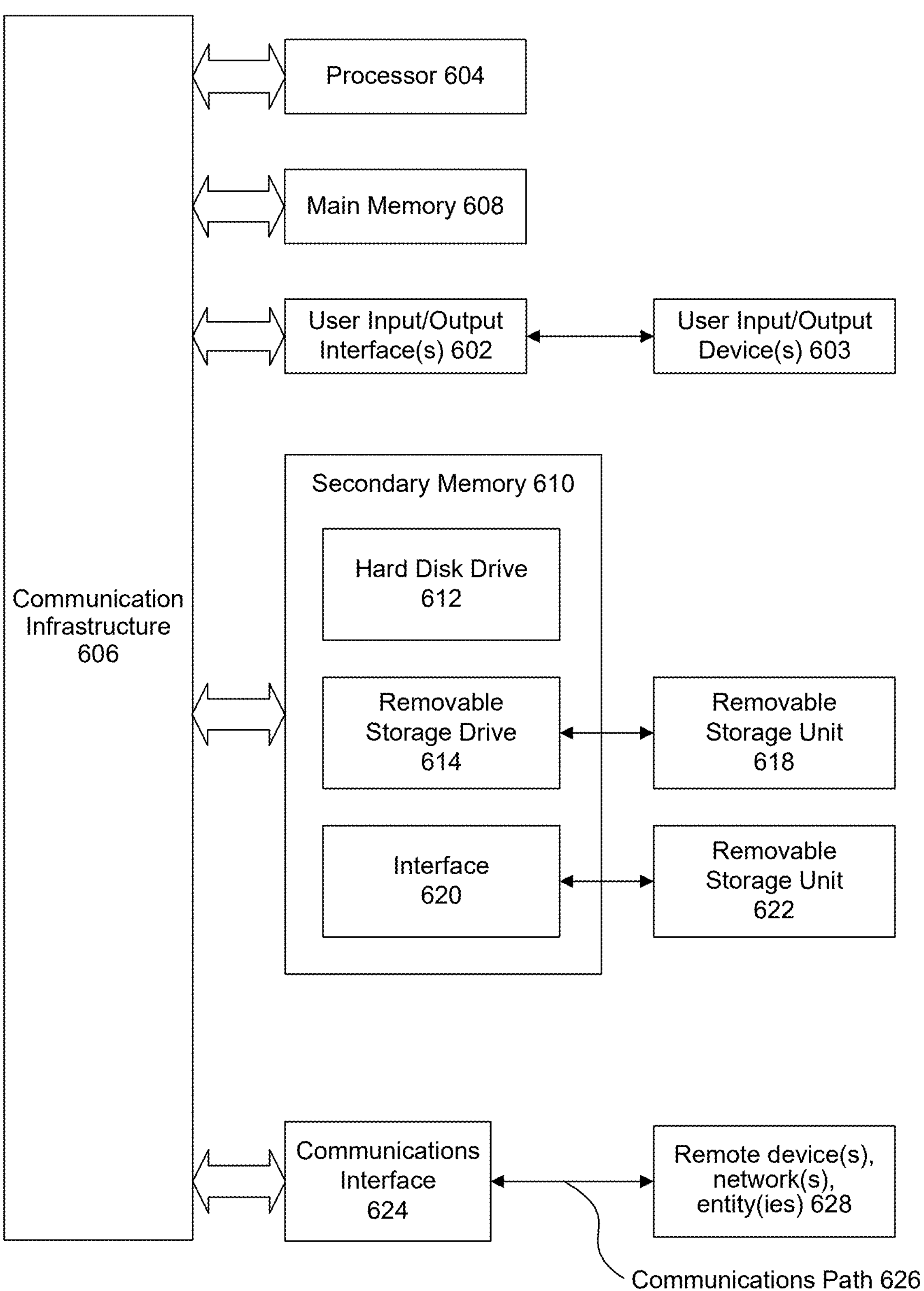
FIG. 6 is a block diagram illustrating an exemplary computer system for implementing embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for managing proxy pools, comprising:

in response to a first request to scrape data from a first target server, the first request from a first client:

(a) identifying a proxy pool index associated with the first client, the proxy pool index specifying an ordered plurality of exit proxies satisfying criteria of the first client;

(b) retrieving a first cursor of the first client, the first cursor defining a first position of the first client within the ordered plurality of exit proxies;

(c) advancing the first cursor to a first next position in the ordered plurality of exit proxies;

(d) selecting, from the ordered plurality of exit proxies, a first exit proxy at the first next position according to the first cursor;

(e) transmitting the first request to the first target server via the selected first exit proxy;

in response to a second request to scrape data from a second target server, the second request from a second client associated with the proxy pool index:

(f) retrieving a second cursor of the second client, the second cursor defining a second position of the second client within the ordered plurality of exit proxies and the second cursor being different than the first cursor;

(g) advancing the second cursor to a second next position in the ordered plurality of exit proxies;

(h) selecting, from the ordered plurality of exit proxies, a second exit proxy at the second next position according to the second cursor; and (i) transmitting the second request to the second target server via the selected second exit proxy.

2. The method of claim 1, wherein the exit proxies in the ordered plurality are selected to satisfy a request option of the first and second client.

3. The method of claim 2, wherein the request option specifies at least one of a region, autonomous system number, priority with which to treat the traffic, IP version, or a database specifying characteristics of IP addresses.

4. The method of claim 1, wherein the first request specifies a first option specifying how the first exit proxy is to be selected, and the second request specifies a second option specifying how the second exit proxy is to be selected, the first and second options being different.

5. The method of claim 4, wherein the selecting (d) comprises selecting the first exit proxy as a first next exit proxy in the ordered plurality of exit proxies that satisfies the first option, and wherein the selecting (d) comprises selecting the second exit proxy as a second next exit proxy in the ordered plurality of exit proxies that satisfies the second option.

6. The method of claim 1, wherein the advancing (c) and advancing (g) occur independently of each other.

7. The method of claim 1, further comprising, in response to a third request to scrape data from a third target server, the third request from the first client:

determining that no valid cursor exists for the first client;

selecting a random proxy from the proxy pool index; and creating the first cursor according to a position of the random proxy in the ordered plurality of exit proxies.

8. The method of claim 1, wherein the ordered plurality of exit proxies is a circular doubly linked list.

9. The method of claim 1, wherein the selected first and second exit proxies are the same.

10. The method of claim 1, wherein the selected first and second exit proxies each belong to a plurality of proxy pools.

11. The method of claim 1, wherein the selecting (c) comprises selecting the first exit proxy such that the first exit proxy is a next exit proxy after the first cursor that is not on a blocked IP address list.

12. The method of claim 1, wherein the identifying the proxy pool index (a) comprises selecting, from a data store, the proxy pool index such that the proxy pool index satisfies criteria specified in the first request, wherein the second request also specifies the criteria of the proxy pool index.

13. The method of claim 12, wherein the identifying the proxy pool index (a) further comprises, when no proxy pool index is present in the data store that satisfies the criteria specified in the first request, generating the proxy pool index and storing the proxy pool index in the data store.

14. The method of claim 12, further comprising:

(k) determining that no request specifying the criteria has been received in a particular time period; and (l) in response to the determination in (k), removing the proxy pool index from the data store.

15. A non-transitory computer-readable device having instructions stored thereon that, when executed by at least one computing device, cause the at least one computing device to perform operations comprising:

in response to a first request to scrape data from a first target server, the first request from a first client:

(a) identifying a proxy pool index associated with the first client, the proxy pool index comprising an ordered plurality of exit proxies satisfying criteria of the first client;

(b) retrieving a first cursor of the first client, the first cursor defining a first position of the first client within the ordered plurality of exit proxies;

(c) advancing the first cursor to a first next position in the ordered plurality of exit proxies;

(d) selecting, from the ordered plurality of exit proxies, a first exit proxy at the first next position according to the first cursor;

(e) transmitting the first request to the first target server via the selected first exit proxy;

in response to a second request to scrape data from a second target server, the second request from a second client associated with the proxy pool index:

(f) retrieving a second cursor of the second client, the second cursor defining a second position of the second client within the ordered plurality of exit proxies and the second cursor being different than the first cursor;

(g) advancing the second cursor to a second next position in the ordered plurality of exit proxies;

(h) selecting, from the ordered plurality of exit proxies, a second exit proxy at the second next position according to the second cursor; and (i) transmitting the second request to the second target server via the selected second exit proxy.

16. The non-transitory computer-readable device of claim 15, wherein the exit proxies in the ordered plurality are selected to satisfy a configuration option of the first and second client.

17. The non-transitory computer-readable device of claim 16, wherein the configuration option specifies at least one of a country, autonomous system number, priority with which to treat the traffic, IP version, or a database specifying characteristics of IP addresses.

18. The non-transitory computer-readable device of claim 15, wherein the first request specifies a first option specifying how the first exit proxy is to be selected, and the second request specifies a second option specifying how the second exit proxy is to be selected, the first and second options being different.

19. The non-transitory computer-readable device of claim 18, wherein the selecting (d) comprises selecting the first exit proxy as a first next exit proxy in the ordered plurality of exit proxies that satisfies the first option, and wherein the selecting (h) comprises selecting the second exit proxy as a second next exit proxy in the ordered plurality of exit proxies that satisfies the second option.

20. The non-transitory computer-readable device of claim 15, wherein the advancing (c) and advancing (g) occur independently of each other.

21. The non-transitory computer-readable device of claim 15, further comprising, in response to a third request to scrape data from a third target server, the third request from the first client:

determining that no valid cursor exists for the first client;

selecting a random exit proxy from the proxy pool index; and creating the first cursor according to a position of the random exit proxy in the ordered plurality of exit proxies.

22. The non-transitory computer-readable device of claim 15, wherein the ordered plurality of exit proxies is a circular doubly linked list.

23. The non-transitory computer-readable device of claim 15, wherein the selected first and second exit proxies each belong to a plurality of proxy pools.

24. The non-transitory computer-readable device of claim 15, wherein the identifying the proxy pool index (a) comprises selecting the proxy pool index such that the pool index satisfies criteria specified in the first request, wherein the second request also specifies the criteria of the proxy pool index.

25. A method for managing proxy pools, comprising:

in response to a first request to scrape data from a first target server, the first request from a first client:

(a) identifying a proxy pool index associated with the first client, the proxy pool index comprising an ordered plurality of exit proxies satisfying criteria of the first client;

(b) retrieving a first cursor of the first client, the first cursor defining a first position of the first client within the ordered plurality of exit proxies;

(c) selecting, from the ordered plurality of exit proxies, a first exit proxy at the first position according to the first cursor;

(d) transmitting the first request to the first target server via the selected first exit proxy;

(e) advancing the first cursor to a first next position in the ordered plurality of exit proxies;

in response to a second request to scrape data from a second target server, the second request from a second client associated with the proxy pool index:

(f) retrieving a second cursor of the second client, the second cursor defining a second position of the second client within the ordered plurality of exit proxies and the second cursor being different than the first cursor;

(g) selecting, from the ordered plurality of exit proxies, a second exit proxy at the second position according to the second cursor;

(h) transmitting the second request to the second target server via the selected second exit proxy; and (i) advancing the second cursor to a second next position in the ordered plurality of exit proxies.

* * * * *